United States Patent
Hutchinson et al.

[15] 3,656,239
[45] Apr. 18, 1972

[54] MEASURING APPARATUS

[72] Inventors: Desmond Ernest Hutchinson; John David Bickerdike, both of Bradford, England

[73] Assignee: The English Electric Company Limited, London, England

[22] Filed: Apr. 7, 1969

[21] Appl. No.: 813,966

[30] Foreign Application Priority Data

Apr. 9, 1968 Great Britain................17,066/68

[52] U.S. Cl..................33/141 R, 33/174 L, 33/178 E
[51] Int. Cl..........................G01b 3/12, G01b 7/04
[58] Field of Search............33/141 A, 141 B, 174 P, 174 L, 33/174 PA, 148 A, 148 B, 148 D, 148 E, 148 H, 141.5, 142, 143 L, 147 L, 147 N, 149 J, 178 E

[56] References Cited

UNITED STATES PATENTS

| | | | |
|---|---|---|---|
| 2,554,171 | 5/1951 | Brunat et al. | 33/174 L |
| 2,844,879 | 7/1958 | Roeget | 33/174 P |
| 2,988,218 | 6/1961 | Fedorchak et al. | 33/174 L |
| 3,077,804 | 2/1963 | Manaloris | 33/141 B |
| 3,481,042 | 12/1969 | Lemelson | 33/174 L |
| 3,509,635 | 5/1970 | Meinke | 33/174 L |
| 3,524,130 | 8/1970 | Asmanse | 33/174 L |

Primary Examiner—Leonard Forman
Assistant Examiner—Steven L. Stephan
Attorney—Misegades and Douglas, Keith Misegades and George R. Douglas, Jr.

[57] ABSTRACT

Apparatus for measuring the diameter of a workpiece includes a wheel which is rotated by contact with the workpiece and drives a pulse generator. The number of pulses generated during each revolution is counted and gives a direct indication of the workpiece diameter.

The wheel is positioned by a unit which automatically sets the pressure of the wheel against the workpiece and retracts the wheel if any of a number of fault conditions occurs such as the feeding of the wheel against the side of a shoulder on the workpiece; reaching the limit of travel of the wheel without having reached the workpiece; over-pressure on the wheel caused, for example, by swarf between the wheel and the workpiece; and excessive forward movement of the wheel.

6 Claims, 5 Drawing Figures

MEASURING APPARATUS

This invention relates to measuring apparatus.

According to the invention, measuring apparatus for measuring a dimension of an object includes a measuring head which is operable at a measuring position to cause the production of an indication of said dimension, and head retracting means arranged to retract said head automatically from said position under predetermined conditions.

Preferably the head retracting means is also operable to advance the head automatically towards said position.

One embodiment of the invention will now be described, by way of example, with reference to the accompanying drawings, in which:-

Figure 1:
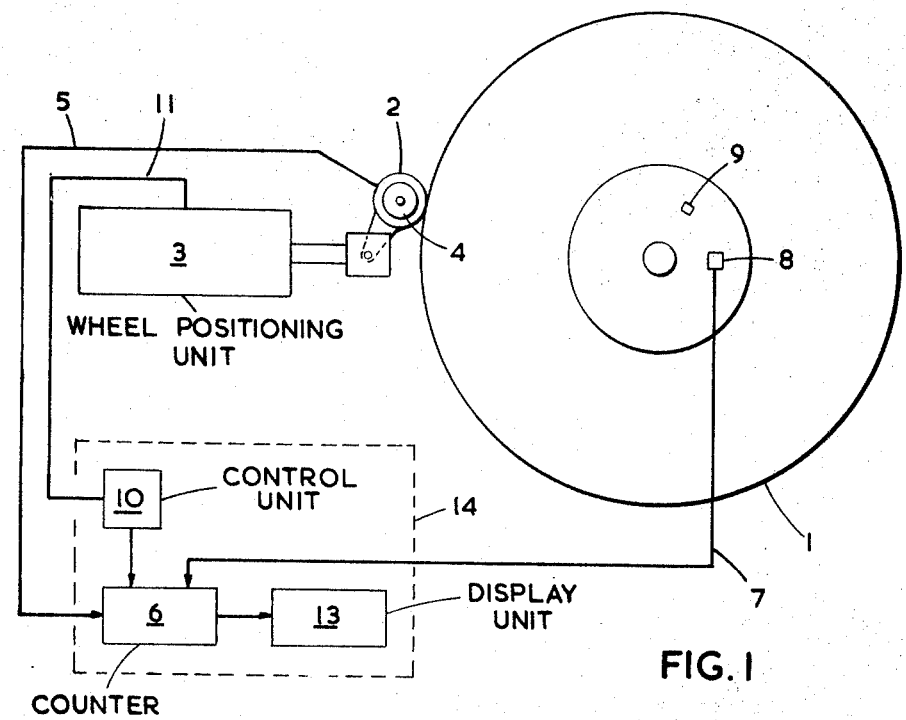
FIG. 1 is a block schematic diagram of diameter measuring apparatus.

Referring now to FIG. 1 of the drawings, measuring apparatus for measuring the outside or inside diameter of a workpiece 1 which is rotated in a machine such as a lathe or a boring machine (not shown), includes a measuring head including a wheel 2 which is urged into contact with the surface of the workpiece 1 by a wheel positioning unit 3, attached to a tool-post (not shown) on the machine.

During rotation of the wheel 2, pulses are generated by a pulse generator 4 and are passed over a line 5 to a pulse counter 6. The pulse generator 4 may be of any suitable kind and may be, for example, an optical grating arrangement. An amplifier may be included in the generator 4 in order to obtain a high signal/noise ratio.

The completion of each revolution of the workpiece 1 is signalled to the counter 6 by a pulse passed over a line 7 from a transducer 8 each time a marker 9 passes the transducer 8. The transducer 8 may, for example, include a lamp and a photocell which is energised by light from the lamp only when the marker 9 is coincident with the transducer 8. The marker 9 may then be a piece of reflective material attached to the workpiece 1, to the work holder of the machine, or to any other part of the machine which revolves in synchronism with the workpiece 1. The transducer 8 may alternatively be, for example, a magnetic transducer, the marker 9 then being formed of magnetic material.

The counter 6 counts the total number of pulses generated by the generator 4 during a complete revolution of the workpiece 1. The diameter of the wheel 2 and the number of pulses generated during each revolution of the wheel 2 are so arranged that this total number of pulses gives a direct indication of the workpiece diameter. Alternatively, by adjustment of a control unit 10, a slower but more accurate measurement of the diameter can be obtained during 10 revolutions of the workpiece 1.

The counter 6 is arranged to transfer the total count at the end of each measuring period into a display unit 13 which gives a direct indication of the diameter of the workpiece 1. The counter 6 and the display unit 13 may be of the kind described in co-pending Application Ser. No. 826,250, filed May 20, 1969, having UK Convention date of claim of priority of May 20, 1968, The counter 6, the control unit 10 and the display unit 13 may be combined into a single unit 14 for more convenient use by the machine operator.

Figure 2:
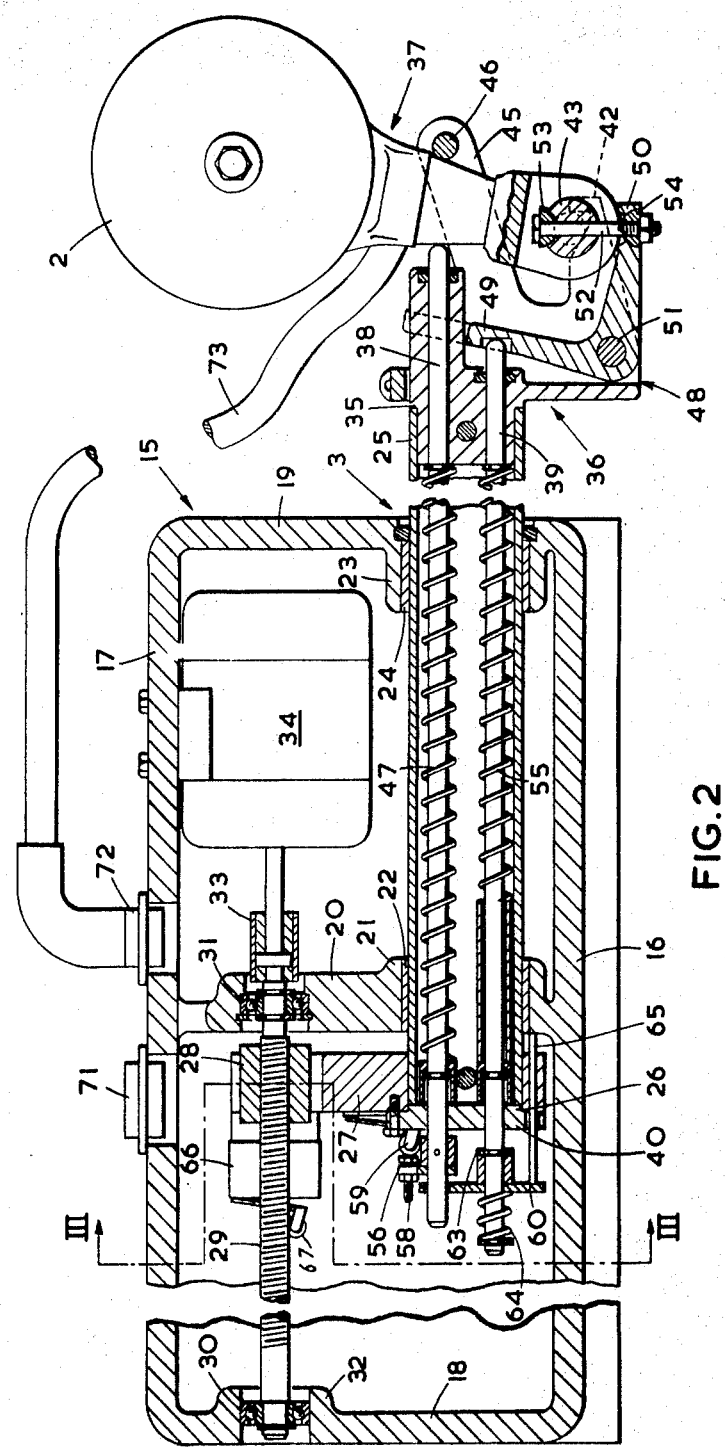
FIG. 2 is a longitudinal section of a measuring wheel positioning unit.
Figure 3:
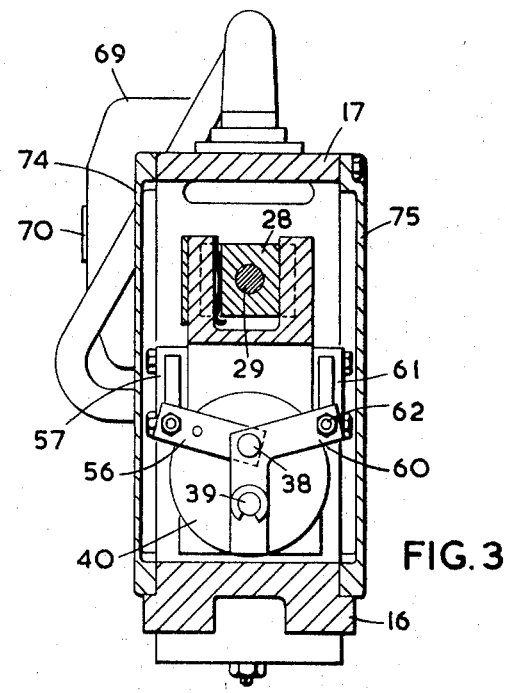
FIG. 3 is a section on the line III-III of FIG. 2.
Figure 4:
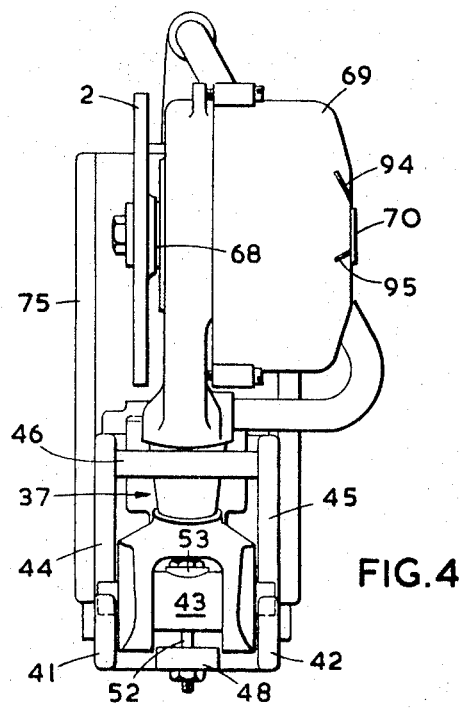
FIG. 4 is an end view of the positioning unit.

Referring now to FIGS. 2, 3 and 4 of the drawings, the wheel positioning unit 3 includes a case 15 having integrally formed base 16, top 17 and ends 18 and 19. The unit 3 is mountable on the tool-post of the machine by the base 16. Extending vertically within the case 15 is a transverse web 20 having a boss 21 fitted with a bearing sleeve 22. A boss 23, formed on the internal surface of the end 19, has a similar sleeve 24; the sleeves 22 and 24 being accurately aligned to provide bearing surfaces in which a tube 25 can slide.

That end 26 of the tube 25 which is within the case 15 is pinned to a vertical actuating member 27. An internally threaded block 28 attached to the upper end of the member 27 mates with a threaded shaft 29 which is journalled in bearings 30 and 31 housed, respectively, in an internal boss 32 on the end 18 and in web 20. The shaft 29 is coupled by a flexible coupling 33 to a motor 34 bolted inside the top 17 of the case 15.

The other end 35 of the tube 25 lies outside the case 15 and carries a cradle member 36 for supporting an arm 37 on which the wheel 2 rotates. The member 36 has two apertures in which rods 38 and 39, respectively, are a sliding fit. The rods 38 and 39 extend through the tube 25 and through a plate 40 covering the end 26 of the tube 25. Two parallel arms 41 and 42 of the member 36 are notched near their free ends to house a pin 43 on which the arm 37 pivots.

Two further parallel arms 44 and 45 of the member 36 carry a pin 46 which acts as a stop against excessive rotation of the arm 37 in a clockwise direction as viewed in FIG. 2. The rod 38 is urged by a compression spring 47 against the arm 37, thereby holding the arm 37 in contact with the pin 46 when the wheel 2 is not in use.

An angle member 48 having two limbs 49 and 50 is pivoted on a pin 51 attached to the member 36. A bolt 52 passes through hemispherical bushes 53 and 54 in the pin 43 and in the arm 50, respectively. The bushes 53 and 54 allow relative angular movement between the pin 43 and the arm 50, but the bolt 52 restrains any movement of the pin 43 away from the limb 50. A compression spring 55 urges the rod 39 against the limb 49 so that the arm 50 pulls the pin 43 down into the V-notches in the arms 41 and 42.

A switch-operating arm 56 is secured to the rod 38 adjacent the plate 40 and is arranged, under normal operating conditions, to maintain a micro switch 57, attached to the member 27, in an operated condition, by contact between an adjusting screw 58 and the operating lever 59 of the switch. A further switch-operating arm 60 is mounted on the rod 39 and is arranged, under normal operating conditions, to maintain a micro switch 61, attached to the member 27, in an operated condition, by contact between an adjusting screw 62 and an operating lever (not shown) of the switch. The arm 60 is a sliding fit on the rods 38 and 39 but is urged against a circlip 63 on the rod 39 by a spring 64 so that the arm 60 normally moves with the rod 39. Movement of the arm 60 towards the web 20 is limited by a loose pin 65 which is positioned through the member 27 and the plate 40 and which abuts against the web 20 and the arm 60 in the limiting position. A further micro switch 66, attached to the member 27, is operated if a roller 67 on the switch operating lever comes into contact with the end 18 of the case 15.

The rotating optical grating (not shown) of the generator 4 is mounted on a common spindle 68 with the wheel 2 and is housed within a cover 69 which has a centrally positioned spirit level 70 for checking the positioning of the wheel 2. Cable connectors 71 and 72 are attached to the top 17 of the case 15. A cable (not shown) connects the unit 3 to the unit 14 (FIG. 1) via the connector 71 and connections between the generator 4 and the unit 14 are made via this cable and via a further cable 73 from the connector 72. Cover plates 74 and 75 are bolted to the case 15. Seals are provided where necessary to ensure that swarf, coolant etc., cannot enter the unit 3.

Figure 5:
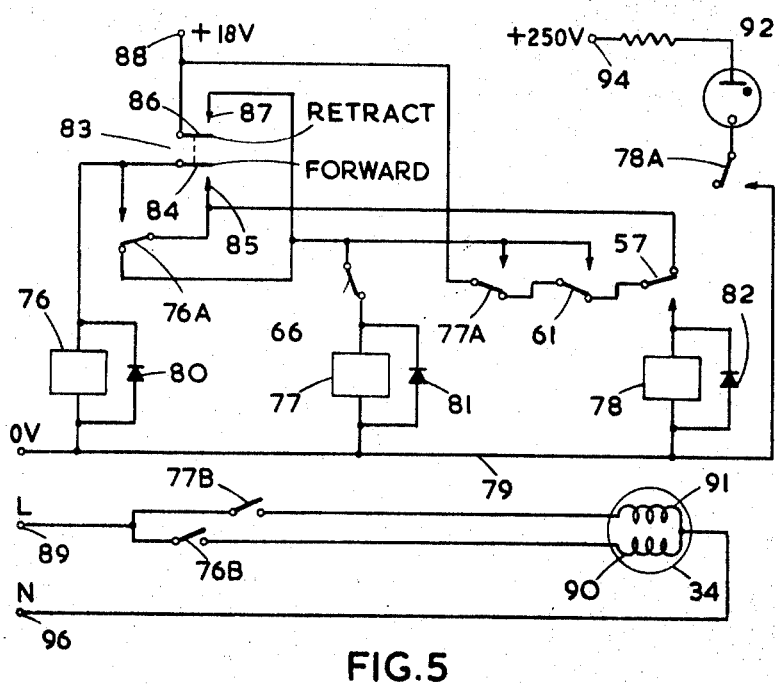
FIG. 5 is a diagram of an operating circuit for the positioning unit.

Referring now to FIG. 5 of the drawings, three relays 76, 77 and 78 in the control unit 10 have contact sets 76A and 76B, 77A and 77B and 78A, respectively. One end of the operating coil of each relay 76, 77 and 78 is connected to a zero potential line 79, and the relays are made slow to release by diodes 80, 81 and 82, respectively, connected across them.

A "forward/retract" switch 83 in the control unit 10 has a blade 84 which connects with a contact 85 when the switch is in the "forward" position, and a blade 86 which connects with a contact 87 in the "retract" position. When the switch 83 is released, the blades 84 and 86 return to their central position. The blade 84 is connected to the other end of the operating coil of the relay 76 and to a normally open (N.O.) contact of the set 76A. The blade 86 is connected to a +18 volt supply 88 of a regulated power supply (not shown), and the contact 87 is connected to a normally closed (N.C.) contact of the set 76A, to the common contact of the switch 66, to an N.O. contact of the set 77A, and to an N.O. contact of the switch 61.

The contact 85 is connected to the common contact of the set 76A and to an N.C. contact of the switch 57. An N.C. contact of the switch 66 is connected to the other end of the operating coil of the relay 77. The common contact of the set 77A is connected to the +18 volt supply 88 and an N.C. contact of that set is connected to the common contact of the switch 61. An N.C. contact of the switch 61 is connected to the common contact of the switch 57, an N.O. contact of which is connected to the operating coil of the relay 78.

The contact sets 76B and 77B are connected between the line terminal 89 of an A.C. supply and "forward" and "reverse" windings 90 and 91, respectively, of the motor 34. The other ends of the windings 90 and 91 are connected to the neutral terminal 96 of the A.C. supply. An N.O. contact of the set 78A is connected to the line 79, and the common contact is connected to the cathode of a neon indicator 92. The anode of the indicator 92 is connected via resistor 93 to a +250 volt terminal 94 of the power supply.

In operation of the measuring apparatus, the machine operator first ensures that the unit 3 is correctly positioned on the tool-post so that the axis of the wheel 2 is parallel to the axis of the workpiece 1 and so that the point of contact between the wheel 2 of the workpiece 1 will lie within a predetermined length of arc of the wheel 2. Marks 94 and 95 indicating the limits of the arc are provided on the cover 69 (FIG. 4).

If the positions of the wheel 2 and the generator 4 need to be interchanged to accommodate the opposite direction of traverse of the wheel 2 along the workpiece 1, the arm 37 may merely be lifted manually so that the pin 43 comes out of the V-notches in the arms 41, 42, thereby lifting the limb 50 and causing the rod 39 to compress the spring 55 further. The arm 37 and the pin 43 may then be rotated through 180° about the bolt 52, the pin 43 then being repositioned in the V-notches. Further indicating marks (not shown) are provided on the cover 69 to indicate the allowable limits of the arc of contact when the wheel 2 is in this reverse position.

When the wheel 2 has been correctly aligned on the tool-post, the operator can start the machining operation on the workpiece 1, the wheel 2 remaining in the retracted position. When the operator is ready to check the diameter of the rotating workpiece 1, he moves the switch 83 (FIG. 5) to the "forward" position. This completes an energising circuit for the relay 76 from the +18 volt supply 88 through the contact set 77A, the switch 61, the switch 57, the contact 85 and the blade 84. The relay 76 is therefore energised and the contact set 76A is switched over to maintain the circuit when the switch 83 is released. The contacts of set 76B are closed and the "forward" winding 90 of the motor 34 is energised.

The motor 34 therefore rotates so that the block 28 is wound along the shaft 29 towards the right (as viewed in FIG. 2), carrying with it the tube 25. The wheel 2 therefore approaches and makes contact with the workpiece 1. The motor 34 continues to move the tube 25, thereby imparting to the arm 37 an anti-clockwise rotation (since the wheel 2 cannot move any further). The arm 37 leaves the stop pin 46 and pushes the rod 38 towards the left. This tends to part the screw 58 from the roller 59 and the contacts of the switch 57 (FIG. 3) therefore change over. This occurs when a gap of, say, 0.050 ins. exists between the arm 37 and the pin 46, and this corresponds to an effective movement of the wheel 2 backwards from its rest position by approximately one-eight inch, measured at the point of contact with the workpiece 1. Under these conditions the spring 47 is compressed to an extent such that it exerts the required force on the arm 37 to press the wheel 2 into contact with the workpiece 1.

The switching over of the contacts of the switch 57 (FIG. 5) opens the energising circuit of the relay 76. The contacts 76B then open, thereby switching off the motor 34. A circuit for the relay 78 is established from the +18 volt supply 88 through contacts 77A, switch 61 and the newly connected contacts of the switch 57. The contacts 78A therefore close and the indicator 92 is illuminated, showing the operator that the measuring apparatus is ready to run.

The pulses produced by the generator 4 are counted over one revolution or 10 revolutions of the workpiece 1, and the indication of the diameter of the workpiece 1 is produced on the display unit 13 as explained above.

When the operator wishes to retract the wheel 2 from the workpiece 1, he moves the switch 83 to the "retract" position. This connects the relay 77 to the +18 volt supply 88 via the blade 86, the contact 87 and the switch 66. The contacts 77A therefore change over and maintain the energising circuit of the relay 77 when the switch 83 is released. The contacts 77B are also closed and the "reverse" winding 91 of the motor 34 is energised. The tube 25 is therefore retracted until the roller 67 of the switch 66 makes contact with the end 18 of the case 15. The contacts of the switch 66 are then opened and the relay 77 is deenergised.

During setting up and running of the apparatus, a number of abnormal conditions may be encountered. Firstly, if the wheel 2 were initially set in a wrong position relative to the tool tip, the wheel 2 might be fed into contact with the side of a step or shoulder in the workpiece 1. If the arm 37 were rigidly mounted, this condition could clearly lead to severe damage being caused to the wheel 2 and to its associated bearings, etc. However, the present apparatus is so constructed that if such a condition were to occur, the wheel 2 and the arm 37 would tilt, thereby lifting one end of the pin 43 out of its notch in the arm 41 or 42. This would cause the limb 50 to rise and the limb 49 would push the rod 39 towards the left (as viewed in FIG. 2). This would cause the screw 62 to move, or tend to move, away from the operating lever of the switch 61 and the contacts of this switch would change over.

If the wheel 2 were in the process of being fed towards the workpiece by the motor 34 when the fault occurred, the relay 76 would be in an energised state and the contacts 76A and 76B would have been operated as explained above. The changing over of the contacts of the switch 61 under the fault condition would then break the circuit of relay 76 and the forward feeding of the wheel 2 would stop. Simultaneously, the circuit of the relay 77 would be completed from the +18 volt supply 88 through the contacts 77A, the newly connected contacts of the switch 61 and the contacts of the switch 66. The contacts 77B would therefore close thereby energising the "reverse" winding 91 of the motor 34. The tube 25 would therefore move towards the left, hence retracting the wheel 2 automatically. The tube 25 would continue to retract until the roller 67 of the switch 66 contacted the end 18 of the case 15. The contacts of the switch 66 would then open, and the relay 77 would be de-energised. The motor supply via contacts 77 B would therefore be broken and the wheel 2 would remain in this fully retracted position until the operator again moved the switch 83 to the "forward" position.

If the wheel 2 had already been fed to its normal operating position before the fault, occurred, the above switching operations would have been performed with the exception of those relating to the de-energisation of the relay 76, since this would already have been de-energised.

Another possible fault condition occurs if the wheel 2, having been set in its normal operating position as explained above, is forced back by, for example, a large piece of swarf getting between it and the workpiece 1. In this case the rod 38 would be pushed towards the left (as viewed in FIG. 2), and this would cause the arm 56 to contact the arm 60, thereby operating the switch 61. The automatic retraction sequence would then be put into operation as described above, and the wheel 2 would be fully retracted and remain so until the switch 83 was again operated.

A further possible fault occurs if the operator has set the tool-post so far away from the workpiece surface that the wheel 2 does not reach the workpiece 1 before reaching the limit of its travel. The pin 65 then abuts against the web 20 and against the arm 60, thereby restraining the arm 60 from moving forward with the rod 39 as the tube 25 advances. It will be noted that the tube 25 is shown in this fully forward position in FIG 2. This again causes operation of the switch 61 and the rotation of the motor 34 is reversed. The wheel 2 therefore moves back to the fully retracted position as explained above.

A further fault condition occurs if, after the wheel 2 has been set in the correct measuring position, the wheel is allowed to move forward by at least one-sixteenth inch (i.e. so that the arm 37 moves towards the stop pin 46). This may occur because the operator has withdrawn the tool-post from the cutting position, or because a discontinuity, such as a hole, in the workpiece 1 has been encountered. When the tool is again fed towards the workpiece 1, or when the other end of the discontinuity is encountered, the measuring apparatus could be damaged if the wheel 2 has not been retracted. Furthermore, whether or not pulses are still being generated by the generator 4, the total count displayed will not be true indication of the workpiece diameter. Under these conditions the wheel 2 is again caused to retract as follows.

Since the wheel 2 had previously been set in its correct operating position as described above, the contacts of the switch 57 will have changed over, so that the N.O. contact is connected to the common contact prior to the occurrence of the fault. The subsequent movement forward of the arm 37 allows the rod 38 to move towards the right (as viewed in FIG. 2), thereby switching the contacts of the switch 57 back to the condition shown in FIG. 5. The relay 78 is therefore de-energised and the indicator 92 is extinguished. An energising circuit for relay 77 is now completed from the +18 volt supply 88 through contact set 77A, switch 61, switch 57, contact set 76A and switch 66. The "reverse" winding 91 of the motor 34 is therefore energised through contact 77B, and the tube 25 is retracted, carrying the wheel 2 away from the workpiece 1. The motor 34 continues to operate until the switch 66 is operated by contact with the end 18 of the case 15. The unit 3 then remains in this condition until the switch 83 is again set in the "forward" position by the operator.

It will be seen therefore, that in response to the setting of the switch 83 in the "forward" position by the machine operator, the wheel 2 is automatically moved into position in contact with the workpiece 1 and the correct contact pressure is maintained by the spring 47. Cutting of the workpiece 1 and measurement of its diameter may be carried out simultaneously, a rapid measurement being obtainable in one revolution of the workpiece, or a less rapid but more accurate measurement being obtainable in 10 revolutions of the workpiece. The wheel 2 may be retracted by setting the switch 83 in the "retract" position. If any of the faults set out above should occur, the wheel 2 is automatically fully retracted and remains in that position until the operator again sets the switch 83 in the "forward" position.

The wheel 2 may be formed of a thermally inert material such as a 36 percent nickel-iron alloy. The wheel 2 may be coated at its rim with tungsten carbide to provide resistance to corrosion, wear and bruising. The wheel 2 may have a diameter of 5 inches and the generator 4 may generate 5,000 pulses for each revolution of the wheel 2. In this case, each 1,000 pulses generated during a revolution of the workpiece 1 represent a workpiece diameter of 1 inch. If a 5 inch diameter wheel is used, the wheel may be safely fed to within one-eighth inch of a shoulder on the workpiece provided that the shoulder is no more than 1½ inches deep. If the shoulder is of greater depth, the wheel may be fed to within 1 in. of the shoulder.

Clearly, other forms of the apparatus may be provided without departing from the scope of the invention. For example, in a simpler form, the wheel 2 might be positioned manually but retracted automatically by the unit 3 as described above. Although the unit 3 is shown in FIG. 2 with the tube 25 horizontal and the wheel 2 vertical, clearly the unit may be operated in any position. By suitable modification of the member 36, or of the arm 37, the wheel 2 could lie at any other angle relative to the tube 25. Furthermore, the wheel 2 could be replaced by a roller or other suitable member. Although the base 16 is shown as having a channel section in FIG. 3, it may be of any suitable form for fixing to the tool-post. Alternatively, the unit 3 may be attached to any other member of the machine. The electric motor 34 could be replaced by other power-operated means such as a hydraulic motor, the supply of fluid to which is controlled by solenoid valves operated by the switches 76B and 77B.

Although the apparatus as described above is arranged to measure the inside or outside diameter of a workpiece, it could alternatively be used to measure the inside or outside diameter of any object. The apparatus may conveniently be used for measuring a wide range of diameters, the lower limit being set by the lowest degree of accuracy which is tolerable for the measurements and the upper limit by the maximum distance which can be tolerated between the units of the apparatus. Furthermore, the apparatus could be used for making linear measurements, the counting of the pulses then being started and stopped at the two ends of the required linear measurement. The automatic positioning and retraction facilities provided by the unit 3 would clearly be advantageous in making such linear measurements.

We claim:

1. Apparatus for measuring at least one dimension of an object, said apparatus comprising a wheel mounted for rotation, a pulse generator mounted for being driven by said wheel, wheel moving means actuable to advance and retract said wheel relative to said object, resiliently biased means mounted for urging said wheel into contact with said object when said wheel is in an advanced position, and means responsive upon application thereto of an excessive reaction by virtue of a fault effecting movement of the wheel in the direction of retraction of said wheel moving means to initiate retraction of said wheel, by said wheel moving means.

2. Apparatus as claimed in claim 1 wherein means are provided to initiate retraction of said wheel, if when said wheel is in an advanced position, said wheel moves in the direction of advancement of said wheel by more than a predetermined distance.

3. Apparatus as claimed in claim 1, wherein means are provided to initiate retraction of said wheel if the latter advances to a limit of its travel without said wheel engaging said object.

4. Apparatus as claimed in claim 1, wherein said wheel retracting means further includes a housing arranged for mounting at a predetermined distance from said object, said wheel moving means being slidable relative to said housing.

5. Apparatus as claimed in claim 14, wherein power-operated means are provided for effecting slidable movement of said wheel moving means relative to the housing.

6. Apparatus as claimed in claim 1, including an arm carrying said wheel; a notched member of said wheel moving means; pivot means for said arm urged into engagement with said notched member; and means to initiate retraction of said wheel in response to movement of the pivot means out of said engagement.

* * * * *